INVENTOR:
Giusto Fonda-Bonardi
By Robert H. Lentz
Attorney.

INVENTOR:
Giusto Fonda-Bonardi
By Robert H. Lentz
Attorney.

United States Patent Office 2,950,444

Patented Aug. 23, 1960

2,950,444

MICROWAVE DEVICES EMPLOYING QUANTUM TRANSITION RESONANCE PHENOMENA

Giusto Fonda-Bonardi, Lakewood, Calif.
(2075 Linda Flora Drive, Los Angeles 24, Calif.)

Filed Oct. 3, 1957, Ser. No. 687,993

13 Claims. (Cl. 331—3)

This invention relates to microwave devices employing quantum transition resonance phenomena, and more particularly to microwave devices which employ molecular or atomic resonance in a dual mode transmission line to provide electrical output energy at a substantially constant frequency.

In relatively recent years a great deal of effort has been expended toward the development of reliable and precise frequency standards which are capable of producing an electrical output signal at an extremely stable frequency. One rather obvious application for such devices is in the measurement or control of the frequency of signals obtained from still other signal sources, or in other words, as a primary frequency standard for laboratory use. Still other applications for these standard signal sources are in precision navigational systems, in single sideband communication systems, and in experimental activities. To illustrate this latter utilization, an extremely stable high frequency signal source could be employed to provide an experimental verification of the dependence of oscillator frequency on the local gravitational field, as predicted by the theory of general relativity.

Foremost among the frequency standards thus far developed are those which employ molecular or atomic resonance phenomena for controlling the frequency of an electrical output signal. More particularly, it has been found that changes in the energy state of the molecules or atoms of certain substances are associated with electromagnetic oscillations in the microwave region, the frequency of oscillation being substantially independent of temperature and pressure changes over relatively broad ranges. It should be noted here that the terms molecular resonance and atomic resonance are distinguishable in that molecular resonance appears to rely upon electrically induced changes in the relative positions of the atoms within a molecule as its energy level is changed, while atomic resonance relies upon magnetically induced changes in the relative orientations of the nucleus and an outer shell electron. Although various substances are known which exhibit resonance phenomena in the microwave region, the substances most commonly used heretofore have been ammonia molecules to provide molecular resonance, while atomic resonance is usually provided by atoms of an alkali metal, such as cesium, which has been heated to the gaseous state.

Notwithstanding the foregoing physical distinctions between the mechanisms which produce molecular resonance and atomic resonance, however, the two phenomena are substantially indistinguishable in operation and effect since energy absorption and emission occur in both instances. Inasmuch as a discrete amount or quantum of energy is absorbed or emitted by each molecule or atom which undergoes a transition in its energy state, the term quantum transition resonance will be considered hereinafter to be generic to both molecular resonance and atomic resonance.

In the prior art two different classes of apparatus have been developed which utilize quantum transition resonance for generating stabilized electrical output signals, the distinction between these classes being in the fact that one employs energy absorption to stabilize an external frequency source while the other utilizes energy emission to generate a stable frequency signal. Historically, the energy absorption effect was the first to be experimentally verified and to be utilized for controlling a precision frequency standard, one such structure being shown in U.S. Patent No. 2,699,503, entitled "Atomic Clock" by Harold Lyons et al., issued January 11, 1955. As disclosed in the foregoing patent, the energy absorption devices customarily employ a waveguide filled with ammonia gas into which electrical energy is supplied from an external source at a frequency in the neighborhood of 23,870 megacycles, which is the inversion transition frequency of the nitrogen atom in the 3,3 state of an ammonia molecule. At or near the resonant frequency the interaction of the applied RF field with the internal field of the molecules results in the absorption of energy quanta, thereby raising some of the molecules from one energy state to a higher energy state. Accordingly, if the energy transmitted through the waveguide is monitored as the applied input energy is varied around the resonant frequency of the molecules, a pronounced dip or decrease in the transmitted energy is detectable as the resonant frequency is approached. Thus the gas cell acts as a highly selective frequency discriminator by presenting an output signal whose amplitude is indicative of the proximity of the frequency of the applied signal to the resonant frequency of the gas molecules, and which may therefore be utilized to servo the external oscillator frequency toward the molecular resonance frequency.

Although apparatus of the above-described type has been found to operate reasonably well, it is nevertheless severely restricted in accuracy and utility by the relatively broad spectral width of the absorbed energy. More specifically, although the absorption spectrum of the molecules is as small as or smaller than the bandwidth of conventional tuned cavity resonators when expressed as a percentage of the resonant frequency, its outer limits demark a relatively broad spectral band when compared with the inherent stability of the oscillations occurring within the molecule. This detuning effect is generally thought to be due in part to the fact that some molecules are constantly colliding with other molecules or with the walls of the guide and are therefore subject to external forces which shift the molecules' frequency from the normal value. In addition, the fact that some molecules are moving in the direction of the incident energy while others are moving in the opposite direction creates a Doppler effect so that these molecules may be excited by energy supplied at a frequency above or below their natural frequency of oscillation.

In the second class of prior art quantum transition resonance devices, wherein quanta emission is employed to generate a stabilized output signal, it has been customary to provide means for separating molecules in a high energy state from those in a low energy state, as by the action of a non-uniform static field upon a molecular beam for example, and to focus the high energy state molecules in a resonant cavity where the interaction of the internal field of the molecules with the RF field of the cavity results in a decay of their energy level with a concomitant emission of quanta which in turn reinforces the external field. A somewhat similar device has also been developed which employs electron spin resonance induced in cesium atoms. In this device a beam of cesium atoms is first generated in an oven, and is then directed through a non-homogeneous magnetic field, one or more cavities, and on to a detector.

Although the foregoing method of obtaining output energy through emission does produce a relatively sharply defined output spectrum, the output frequency can still be "pulled" to some extent by the tuning of the associated cavity. Moreover, implicit in the utilization of a molecular or an atomic beam is the requirement for complex beam generating apparatus and an exhaust system for continuously removing the material expended in the beam. These latter limitations are of particular significance in airborne applications or when it is desired to keep the equipment in continuous operation for relatively long periods of time.

The present invention, on the other hand, overcomes the foregoing and other disadvantages of the prior art structures while retaining their principal advantages. In accordance with the basis concept of the present invention, microwave output energy is produced by stimulating a quantum transition resonant substance within a waveguide cell with microwave energy supplied in one mode, to thereby raise the population of its higher energy level, and by extracting in a mutually orthogonal mode monochromatic energy emitted by the higher energy particles as they return again to their lower energy state.

More specifically, in accordance with the invention microwave devices are disclosed which employ an aperiodic transmission line, such as a matched waveguide, for enclosing a quantum transition resonant substance. As will be seen from the detailed description hereinbelow, the waveguide is dimensioned so that it will support two mutually orthogonal modes of propagation, one of which is used to supply input energy to raise the population of a higher energy level of the resonant substance, while the other is employed to extract a pure and monochromatic output signal undistorted by leakage of input energy to the output mode.

In its preferred form the matched transmission line comprises a dual mode waveguide which is sealed off by windows or the like to provide an enclosed cell for containing particles of a molecular resonant substance, such as ammonia molecules for example. As hereinafter set forth, the waveguide configuration and dimensions, the internal gas density, and other related parameters are selected to minimize leakage between the input and output modes and to assure an essentially line spectrum output signal at the inherent resonant frequency of the gas molecules and free from any frequency pulling effects. As further shown and described hereinbelow, the basic concept of the invention may be employed to provide precise frequency stabilized microwave oscillators, or may be utilized to provide microwave devices for amplying or otherwise modifying applied microwave input signals.

It is therefore an object of the invention to provide microwave devices which employ quantum transition resonance phenomena in a dual mode transmission line to provide electrical output energy at a substantially constant frequency.

Another object of the invention is to provide microwave devices employing quantum transition resonance phenomena for generating monochromatic microwave energy in an aperiodic transmission line.

It is a further object of the invention to produce a frequency stabilized microwave output signal by stimulating a quantum transition resonant substance within a waveguide cell with microwave energy supplied in one mode, and by extracting in a mutually orthogonal mode monochromatic energy generated by quanta emission from the substance.

Another object of the invention is to provide microwave devices which employ a dual mode waveguide containing a molecular resonant substance for absorbing input energy received in one mode, and for generating a monochromatic electrical output signal in a second mode orthogonal with respect to the input mode.

It is still another object to provide frequency stabilized microwave devices which function to absorb by quanta absorption microwave energy supplied in one mode and to generate in a second mode, orthogonal to the input mode, microwave energy by quanta emission.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Fig. 1 is a generic block diagram illustrating the basic elements of microwave devices constructed in accordance with the present invention;

Figs. 2*a* and 2*b* are cross-sectional views of typical waveguide configurations which may be employed in the dual mode waveguide cell of Fig. 1;

Figure 1:
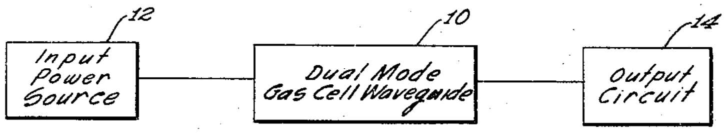

With reference now to the drawings, wherein like or corresponding parts are designated by the same reference characters throughout the several views, there is shown in Fig. 1 a generic block diagram of a microwave device, according to the invention, which employs quantum transition resonance phenomena in a dual mode microwave transmission line to provide electrical output energy at a substantially constant frequency. As shown in Fig. 1, the microwave devices herein disclosed include three basic elements, namely, a dual mode waveguide cell 10 which is capable of transmitting or propagating microwave energy in two mutually orthogonal modes and which contains a substance such as ammonia for exhibiting resonance in the microwave region, an input power source 12 which is operative to supply input energy to cell 10 in one mode for raising, through quanta absorption, the population of a higher energy level of the substance, and an output circuit or utilization device 14 which receives monochromatic output energy generated within the gas cell by quanta emission in a mode orthogonal to the input mode.

As indicated hereinabove, the basic concepts of the present invention are application to the use of substances which exhibit molecular resonance, such as ammonia, or to substances which exhibit atomic resonance, such as alkali metal atoms. For purposes of simplicity, however, it will be assumed hereinafter that molecules of ammonia gas are contained within waveguide cell 10, and that the various embodiments of the invention described hereinbelow are designed to operate at the inversion frequency of ammonia molecules in the 3,3 state, or in other words, at approximately 23,870 megacycles.

Before describing the various interrelated factors which must be considered in constructing dual mode waveguide cell 10, consider first the physical behavior of the molecules within the cell and the manner in which they function to provide monochromatic output energy in accordance with the invention. It may be shown that at a given ambient temperature the molecules of a confined body of a microwave resonant gas, such as ammonia, assume a population distribution in various discrete quantum energy states, the population of the lower energy states being normally more dense than that of the higher energy states. It may also be shown that if the gas is subjected to an RF field at or near the resonant frequency of the molecules, some of the molecules in the lower energy states will absorb quanta and thereby be excited to a higher energy state. Thus the population of the higher energy levels will be increased until a new equilibrium condition is reached whereat once again as many molecules are absorbing quanta per unit time, as there are molecules reverting to their lower energy states through loss of quanta by collision or radiation.

Assume now that the microwave resonant gas is placed in a sealed-off waveguide which is capable of transmitting microwave energy in two orthogonal modes of propagation, as taught by the present invention. If input energy is then supplied to the waveguide in one of the two orthogonal modes, it is clear that the number of high energy state molecules will be increased through energy absorption until equilibrium is obtained in the above-described manner, while the second mode will be completely isolated from the input energy by virtue of the orthogonality of the modes. It may be shown, however, that molecules which are in their high energy state and emit energy by radiation in reverting to a lower energy state have a finite probability of delivering that energy to either one of the modes which the guide can propagate. Consequently, it is possible to obtain from the second or output mode microwave energy which is pure and monochromatic at the inherent resonant frequency of the molecules, and which is undistorted by any deviations in the frequency of the exciting power.

Consider now the various factors which are significant in the design of the dual mode waveguide cell embodied in the invention. It should first be pointed out that in accordance with the invention the waveguide cell is preferably a matched transmission line at the resonant frequency of the enclosed gas, or in other words, is an aperiodic structure rather than a resonator, thereby eliminating any tendency of the waveguide to pull the frequency of the oscillations generated therein. In addition, as will be described in more detail hereinbelow, the waveguide cell must be provided with suitable windows and seals to contain the gas molecules within the cell while simultaneously permitting the passage of electrical energy into and out of the cell.

Figure 2A:
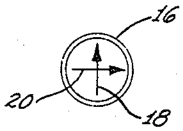
Figure 2B:
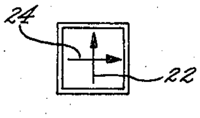

From a dimensional standpoint, the waveguide cell may be constructed of any form of waveguide which is capable of supporting two mutually orthogonal modes of propagation. For example, the cell may comprise a cylindrical waveguide 16, as shown in Fig. 2*a*, where the arrows 18 and 20 represent the electric field vectors of two mutually orthogonal $TE_{11}$ modes, or may comprise a square waveguide such as is shown in Fig. 2*b*, where the arrows 22 and 24 represent the electric field vectors of two mutually orthogonal $TE_{01}$ modes. It should be emphasized at this point that these waveguide configurations are only illustrative, and should not be interpreted to limit the scope of the invention.

Notwithstanding the fact that the practice of the invention is not restricted to any particular waveguide configuration, it is preferable to utilize in the waveguide cell a circular waveguide whose diameter is sufficient to permit propagation in the $TE_{11}$ mode, but is below cut-off in the next higher or $TM_{01}$ mode. The reasons for thus dimensioning the waveguide cell are twofold. Firstly, it is well known that the attenuation presented by cylindrical waveguide per unit length is less than the corresponding attenuation presented by waveguides having other configurations such as rectangular or square. Consequently, a microwave signal generated by quanta emission will be attenuated less in propagating through the gas cell if the cell employs a cylindrical waveguide, and greater gain per unit length may be achieved thereby.

The reason for limiting the diameter of the cylindrical waveguide, on the other hand, is to suppress higher order modes so that the energy emitted by the decay in the energy level of high energy gas molecules will produce maximum microwave output energy in the desired mode. It is important to note here, however, that the invention is not limited to the use of waveguide in which higher order modes above the fundamental mode are suppressed because they are below cut-off. To illustrate this fact, reference is made to Fig. 3 which is a graph illustrating the relationship of attenuation and waveguide diameter for a cylindrical waveguide which is capable of propagating energy at a fixed frequency in either the fundamental or next higher mode. It will be noted that the attenuation per unit length for the fundamental or $TE_{11}$ mode is less than the attenuation for the $TM_{01}$ mode. If now the dual mode waveguide cell is to be employed in a microwave oscillator, as described hereinbelow with respect to Fig. 4, one can select a guide diameter which permits operation at a point on the characteristic curve above cut-off for the $TM_{01}$ mode and still suppress oscillations in this higher mode by limiting the length of the waveguide cell so that the closed loop feedback gain exceeds unity for the $TE_{11}$ mode but is less than unity for the $TM_{01}$ mode. In other words, the fact that the attenuation presented to the $TM_{01}$ mode is greater than the attenuation presented to the $TE_{11}$ mode may be employed to limit the closed loop gain for the $TM_{01}$ mode to a value whereat oscillations cannot be sustained.

In determining the length of the dual mode waveguide cell, it is again necessary to consider a number of factors. Firstly, the input power density within the guide is significant inasmuch as this will control the relative populations of the high and low energy levels of the gas molecules and thus control the amount of energy available to generate an output signal. Secondly, the gas density within the waveguide cell must be considered inasmuch as this parameter will determine the number of gas molecules within the guide and hence the number of higher energy molecules which will be available to decay to lower energy levels per unit time and thereby generate output energy.

It should be noted here that many of the foregoing factors are interrelated and cannot be varied at will. For example, it would at first appear from the discussion set forth hereinabove that the gas density within the guide should be relatively high in order to provide more gas molecules in a high energy state. It must be remembered, however, that any increase in gas density decreases the intermolecular distances, thereby decreasing the mean free path of the molecules and enhancing the probability of deleterious intermolecular collisions. In practice, therefore, it is preferable to maintain a density such that the internal pressure of the ammonia gas at room temperature is within the range from 1 to 20 microns of mercury so that the mean free path of the molecules is a substantial fraction of the waveguide diameter.

Finally, in determining the length of the waveguide cell consideration should be given to the attenuation per unit length of the waveguide, as described hereinabove with respect to Fig. 3, so that output power will be delivered only to the fundamental mode if the waveguide dimensions are large enough to support one or more higher modes as well. It will be recognized, of course, that this latter factor is important primarily where the dual mode waveguide cell is to be employed in a microwave oscillator.

Owing to the fact that the various parameters set forth above are interrelated, as stated previously, in any given application the input power density, waveguide length and internal gas pressure are best determined empirically or calculated in view of the results which it is desired to achieve. As a general rule, however, it will be found that reasonable output power may be obtained with a guide whose length is within the range from 20 to 60 feet, although the invention is in no sense restricted to the utilization of dual mode gas cells whose length is within this range.

Figures 3, 4:
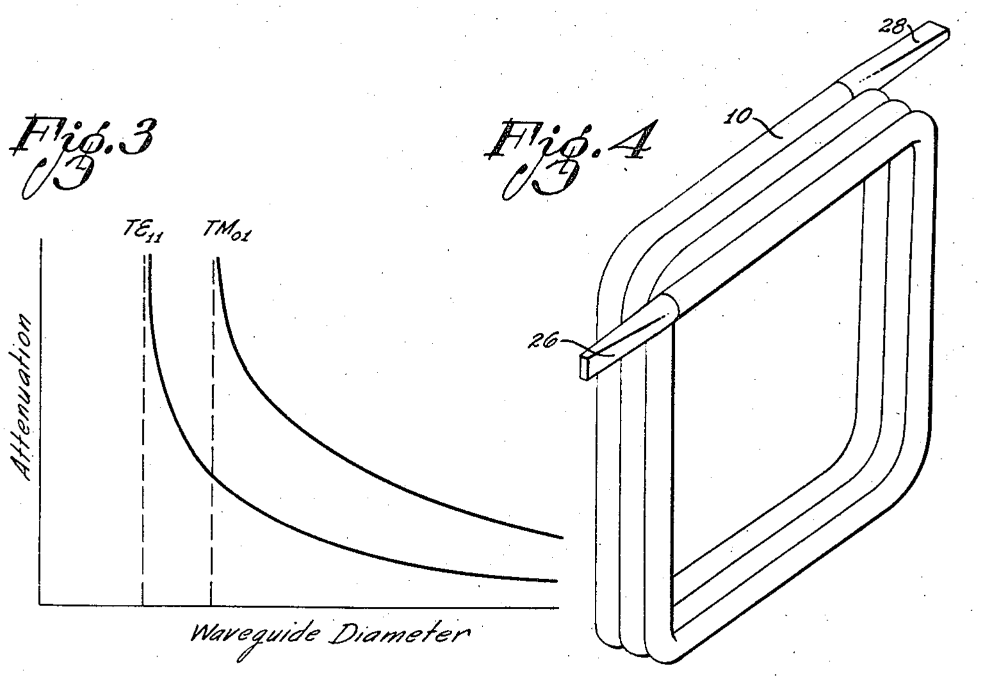
Fig. 3 is a graph illustrating the relationship of attenuation and frequency for a cylindrical waveguide, and is set forth to indicate how the length of the dual mode waveguide may be utilized to control the operation thereof.
Fig. 4 is a perspective view of one practical form which the dual mode waveguide may take.

With reference to Fig. 4, there is shown a perspective view of one embodiment of a dual mode waveguide cell which may be employed in practicing the invention, the cell comprising a gas filled cylindrical waveguide 10 which is here shown to be coiled to provide volumetric efficiency, an input coupler 26 which is utilized to introduce input energy in one mode at one end of waveguide 10, and an output coupler 28 which is employed to present output energy in a orthogonal mode at the opposite end of guide 10. It will be noted that each of couplers 26 and 28 provides a transition from rectangular waveguide to cylindrical waveguide, and thus functions as a mode changer for converting energy incident in the $TE_{01}$ mode to energy in the $TE_{11}$ mode, or vice versa. Although not shown in Fig. 4, the ends of cylindrical waveguide 10 are sealed with suitable windows for containing the ammonia molecules stored therein while simultaneously permitting the passage of input energy into the waveguide at one end and out of the guide at the opposite end. Inasmuch as the manner in which windows may be employed for pressurizing section of waveguide is well known to the microwave art, further description of this detail of the dual mode waveguide cell is considered unnecessary.

It will be appreciated by those skilled in the microwave art that if it is desired to coil the cylindrical waveguide, suitable precautions should be taken to avoid elliptical polarization within the waveguide in order to maintain mode separation. In addition, it will be recognized that the relative orientations of the input and output couplers 26 and 28 may be relatively critical where cylindrical waveguide is employed for supporting two mutually orthogonal modes which must be isolated from each other. In practice the final orientation between the input and output couplers may be achieved by adjusting the relative rotational positions of the couplers, before the ammonia gas is put into the guide, until the cross-coupling between the input mode and output mode is essentially zero.

Figure 5:
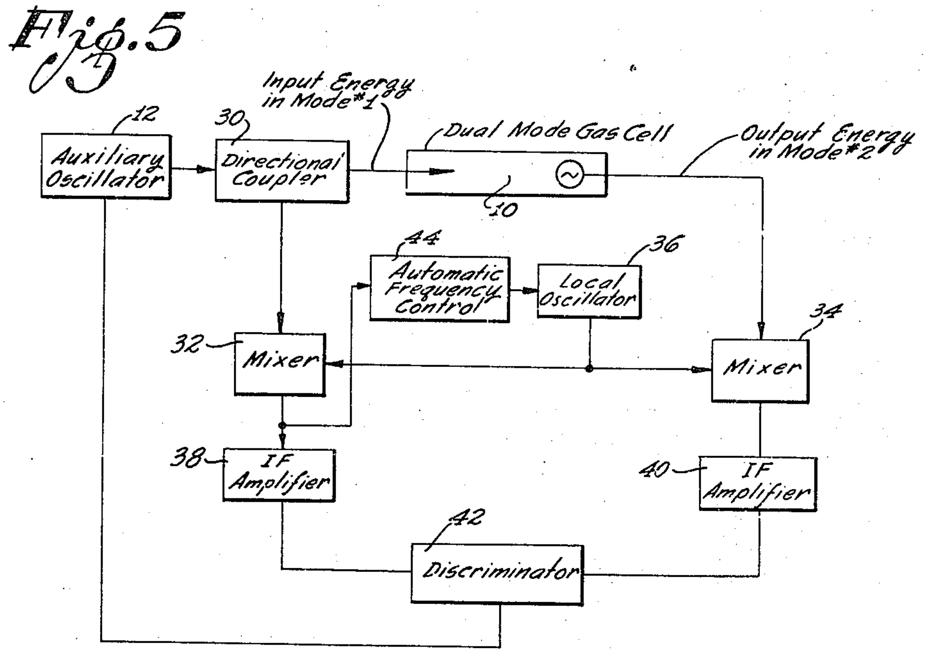
Fig. 5 is a diagramatic view of a frequency stabilized microwave oscillator in accordance with the invention.

With reference now to Fig. 5, there is shown a microwave oscillator, constructed in accordance with the teachings herein set forth, which functions to produce a substantially constant frequency microwave output signal. As shown in Fig. 5, the dual mode gas cell 10 receives energy in one mode, hereinafter termed mode No. 1, from an auxiliary oscillator 12 through a directional coupler 30, the coupler functioning to supply a portion of the oscillator energy to a mixer 32. Oscillator 12, of course, corresponds to the input power source in the block diagram of Fig. 1, and may comprise a voltage tunable reflex klystron for example.

The output energy extracted from the dual mode gas cell, which is presented in what will hereinafter be termed mode No. 2, is in turn applied to one input of a second microwave mixer 34, both of mixers 32 and 34 receiving a second input signal from a comomn local oscillator 36 which may again comprise a reflex klystron. The output signals from mixers 32 and 34 are thereafter applied to a pair of respectively associated IF amplifiers 38 and 40, the output signals therefrom then being combined in a discriminator 42 which functions to generate an output signal whose magnitude and polarity with respect to a predetermined reference level are representative of the phase difference between the signals received from the amplifiers.

The discriminator employed in the microwave oscillator of the invention is preferably of the type known to the art as a phase lock discriminator, the output signal from the discriminator being employed as an automatic frequency control feedback signal which servos the frequency of oscillator 12 toward the natural resonant frequency of the ammonia molecules within the dual mode waveguide cell. In addition to the above-described element, the microwave oscillator of Fig. 5 also includes an automatic frequency control circuit 44, which may be any one of numerous types known to the art, for maintaining substantially constant the intermediate frequency by causing local oscillator 36 to follow or track intermediate frequency variations caused by variations in the frequency of the signal generated by auxiliary oscillator 12.

Consider now the manner in which the microwave oscillator of the invention, as shown in Fig. 5, functions to produce a substantially constant frequency output signal. As described hereinabove, the input energy to the dual mode gas cell need only be in the general neighborhood of the inversion transition frequency of the ammonia molecules inasmuch as the absorption spectrum of the molecules is relatively broad due to molecular collisions and Doppler broadening. On the other hand, the energy generated in the orthogonal output mode No. 2 by quanta emission will be pure and monochromatic at the inherent natural resonant frequency of the ammonia molecules, since the orthogonality of the modes will inhibit leakage of the exciting energy to the output mode of gas cell, while the use of a matched transmission line will preclude pulling of the output frequency. Stated differently, the output mode will carry the emitted frequency only, which is automatically determined as the frequency having the highest emission probability. Moreover, once the output field is established in the waveguide, the emission of quanta will occur in synchronism with it and independently of the input frequency.

Owing to the independence of the output frequency from the frequency of the exciting energy, and the fact that a common local oscillator signal is applied to mixers 32 and 34, it will be recognized that the intermediate frequency signal presented by amplifier 40 will also be independent of the frequency of the exciting energy, while the intermediate frequency signal presented by amplifier 38 will differ in phase and frequency from the signal presented by amplifier 40 in the same manner as the exciting energy applied to the dual mode gas cell differs from the monochromatic output signal derived therefrom. Consequently, the output signal from discriminator 42 is representative of the phase or frequency difference between the energy applied to the dual mode gas cell in mode No. 1 and the energy extracted therefrom in mode No. 2, and may thus be employed to servo the auxiliary frequency to the natural resonant frequency of the ammonia molecules.

It will be appreciated that the frequency stabilized output signal may be obtained directly from the auxiliary oscillator 12, or could even be taken from the output signal in mode No. 2, although the former arrangement appears to be preferable. It will also be appreciated by those skilled in the art that although auxiliary oscillator 12 has been shown and described as operating at or near the resonant frequency of the ammonia molecules within the dual mode waveguide, identical results may be achieved by operating the auxiliary oscillator at a subharmonic frequency and by utilizing a harmonic generator for converting the oscillator signal to input energy at the desired frequency.

The microwave oscillator of the invention, as described hereinabove, provides frequency stability comparable to or better than that achievable with the most elaborate systems of the prior art, while simultaneously providing relatively unlimited life without necessitating shutdowns for rejuvenation, and an output signal whose frequency is independent of external fields. In addition, the oscillator of the invention uses a minimum of auxiliary equipment, is relatively small in size and weight, and provides an output signal whose frequency is independent of temperature deviations owing to the fact that the waveguide gas cell is an aperiodic structure and does include any thermally sensitive cavity resonators.

Figure 6:
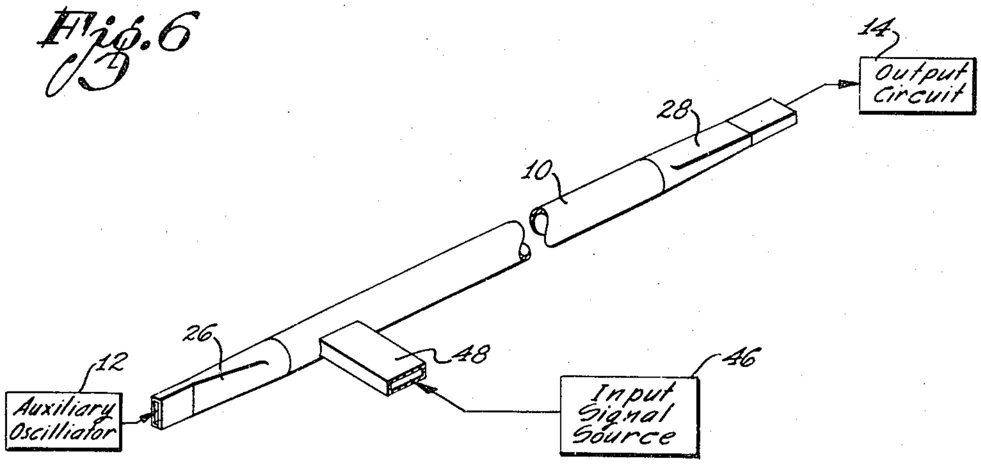
Fig. 6 is a block diagram, partly in schematic form, of a microwave amplifier in accordance with the invention.

It is to be expressly understood that the basic concept of the invention, namely the use of transition resonance phenomena in a waveguide which supports two orthogonal modes of propagation, is not restricted in application to microwave oscillators but could also be employed to provide amplification or modulation of an applied input signal. With reference to Fig. 6, for example, there is shown in block form a tuned amplifying system, in accordance with the invention, which employs a dual mode waveguide 10 for amplifying an input signal received from an input signal source 46, the frequency of the input signal being the same as the resonant frequency of the molecules within the dual mode waveguide.

As shown in Fig. 6, the amplifier system again comprises an input coupler 26 for supplying microwave power in one mode to the molecules within waveguide 10, and an output coupler 28 for applying the amplified output signal to an output circuit 14 in a mode orthogonal with the input mode. In addition, however, the amplifying system also includes an input waveguide 48, equipped with a suitable sealed window, not shown, for receiving the input signal to be amplified, the input signal being applied to the dual mode waveguide in the same mode in which the output power is presented.

It should be pointed out that in utilizing a dual mode waveguide cell, as taught by the present invention, in microwave devices other than an oscillator, the length of the waveguide and/or gas density should be limited so that the internal feedback will be insufficient to permit self-sustained oscillations. If this is done, the input power from source 12 will again function to increase the population of the higher energy levels within the resonant substance enclosed by the waveguide cell, but output energy from quanta emission will be delivered only to reinforce the externally applied input signal, and thereby present an amplified output signal to the output circuit.

It is to be expressly understood, of course, that the basic teachings of the invention may be applied to still other forms of microwave devices, and that dual mode waveguide cells may be constructed having configurations and dimensions differing from those herein disclosed without departing from the invention. Accordingly, the spirit and scope of the invention should be limited only by the spirit and scope of the appended claims.

What is claimed as new is:

1. In a microwave device, the combination comprising: a dual mode waveguide cell containing particles of a quantum transition resonant substance, said waveguide cell being capable of propagating microwave energy in first and second mutually orthogonal modes; input means for applying electrical input energy to said waveguide cell in said first mode to thereby raise a portion of said particles to a higher energy level through quanta absorption, and output means for extracting a microwave output signal from said waveguide cell in said second mode, said output signal being generated within said cell by quanta emission as particles at said higher energy level decay to a lower energy level.

2. In a microwave device wherein molecules of a microwave resonant substance are employed for generating a microwave output signal at an inherent resonant frequency of the molecules, the combination comprising: a dual mode waveguide cell for enclosing molecules of the microwave resonant substance, said waveguide being capable of propagating microwave energy in first and second mutually orthogonal modes; means for supplying electrical input energy to said waveguide cell in said first mode at a frequency in the neighborhood of the resonant frequency thereby to raise some of the enclosed molecules to a predetermined high energy level by quanta absorption; and means for extracting in said second mode an electrical output signal generated within said waveguide cell by the emission of quanta from molecules decaying from said high energy level to a lower energy level, the frequency of said output signal corresponding to said inherent resonant frequency of the molecules.

3. The microwave device defined in claim 2 wherein said dual mode waveguide cell is cylindrical in cross-sectional configuration and said first and second modes are mutually orthogonal $TE_{11}$ modes.

4. The microwave device defined in claim 2 wherein said dual mode waveguide cell is rectangular in cross-sectional configuration and said first and second modes are mutually orthogonal $TE_{01}$ modes.

5. The microwave device defined in claim 2 wherein said input means comprises a tunable microwave oscillator for generating said input energy, and which further includes means responsive to the frequency difference between the input energy and output signal for tuning said microwave oscillator to maintain substantially constant the frequency at which said input energy is supplied to said waveguide cell.

6. The microwave device defined in claim 2 which further includes means for applying an input signal to said waveguide cell in said second mode, said input signal having a frequency substantially equal to said inherent frequency whereby said output signal represents said input signal amplified by the emission of quanta in said second mode.

7. In a microwave device, the combination comprising: a sealed-off section of waveguide; a predetermined quantity of ammonia gas filling said waveguide section, said waveguide being capable of propagating microwave energy at the inversion frequency of ammonia molecules in the 3,3 state in first and second mutually orthogonal modes; means for introducing electrical energy into said waveguide in said first mode at a frequency in the neighborhood of said inversion frequency whereby energy is absorbed by said ammonia gas; and means coupled to said waveguide for extracting microwave energy generated in said second mode at said inversion frequency by energy emission from said ammonia gas.

8. The microwave device defined in claim 7 wherein the density of the ammonia molecules within said waveguide section is such that the internal gas pressure at room temperature is within the range from one to twenty microns of mercury.

9. The microwave device defined in claim 8 wherein said waveguide section is cylindrical in cross-section and has a diameter above cut-off for the $TE_{11}$ mode at said inversion frequency and below cut-off for the $TM_{01}$ mode.

10. The microwave device defined in claim 8 wherein said waveguide section is cylindrical in cross-section and has a diameter above cut-off for the $TE_{11}$ and $TM_{01}$ modes at said inversion frequency, the length of said waveguide being such that energy emitted in the waveguide by said molecules will not support output oscillations in said $TM_{01}$ mode.

11. The microwave device defined in claim 8 wherein said waveguide section is square in cross-section and wherein each of said first and second modes is a $TE_{01}$ mode.

12. In a stabilized frequency oscillator wherein a microwave resonant substance resonant at a predetermined frequency is employed for controlling the frequency of an auxiliary oscillator tunable over a frequency band encompassing said predetermined frequency, the combination comprising: a matched transmission line including a section of waveguide capable of supporting two orthogonal modes of propagation at said predetermined frequency, the microwave resonant substance being enclosed within said waveguide section; means for coupling the auxiliary oscillator to said waveguide section for exciting said microwave resonant substance with energy supplied in one of said two modes; output means coupled to said waveguide section for presenting an output signal at said predetermined frequency in the other of said two modes, said output signal being generated within said waveguide section by energy emitted from said microwave resonant substance; and means responsive to the difference in frequency between said output signal and the signal generated by the auxiliary oscillator for tuning said auxiliary oscillator to maintain said frequency difference at a constant value.

13. The oscillator defined in claim 12 wherein said last named means includes a phase lock discriminator and wherein said frequency difference is substantially zero.

No references cited.